(12) United States Patent
Kimura

(10) Patent No.: US 6,556,846 B1
(45) Date of Patent: Apr. 29, 2003

(54) DEVICE FOR RETRIEVING DIAL DATA AND METHOD OF RETRIEVING DIAL DATA

(75) Inventor: Etsuko Kimura, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/523,560

(22) Filed: Mar. 10, 2000

(30) Foreign Application Priority Data

Mar. 11, 1999 (JP) .............................................. 11-064818

(51) Int. Cl.[7] .................................................. H04B 1/38
(52) U.S. Cl. ........................ 455/563; 455/564; 455/565; 455/569; 379/355.01
(58) Field of Search .............................. 455/564, 565, 455/550, 563; 379/355.01, 355.02, 355.05, 355.06, 355.07, 355.08

(56) References Cited

U.S. PATENT DOCUMENTS

6,185,295 B1 * 2/2001 Fredericksen ............... 379/355
6,260,012 B1 * 7/2001 Park ........................... 704/236
6,314,166 B1 * 11/2001 Laurila ..................... 379/88.03

FOREIGN PATENT DOCUMENTS

| GB | 2333930 | 8/1999 |
|---|---|---|
| JP | 61-184027 | 8/1986 |
| JP | 63-221745 | 9/1988 |
| JP | 63-200946 | 12/1988 |
| JP | 3-88462 | 4/1991 |
| JP | 7-95279 | 4/1995 |
| JP | 8-147248 | 6/1996 |
| JP | 9-233187 | 9/1997 |
| WO | 99/31856 | 6/1999 |

* cited by examiner

*Primary Examiner*—William Trost
*Assistant Examiner*—Brandon J Miller
(74) *Attorney, Agent, or Firm*—Scully, Scott, Murphy & Presser

(57) ABSTRACT

There is provided a device used in a telephone terminal including a dial memory storing at least one address and a plurality of dial data associated with the address, for retrieving one of the dial data, an identifier being assigned to each one of the dial data, the identifier being comprised of a number in accordance with which the dial data is arranged, the device, on receipt of both a first signal indicative of the identifier and an aural signal indicative of the address, retrieving the dial data in accordance with the received first and aural signals, reading out dial data identified by the first and aural signals, and displaying the thus read-out dial data in a display screen. The device makes it possible to retrieve a target dial number more readily and in a shorter period of time than a conventional device.

20 Claims, 5 Drawing Sheets

Bill
  1. 090-123-4567
  2. 090-234-5678
  3. 090-345-6789

Dick
  1. 090-456-7890
  2. 090-567-8901
  3. 090-678-9012
  4. 090-789-0123

John
  1. 090-012-3456
  2. 090-013-4567

DEVICE FOR RETRIEVING DIAL DATA AND METHOD OF RETRIEVING DIAL DATA

BACKGROUND OF THE INVENTION

1. Field of the Invention

The invention relates to a device for retrieving dial data stored in a dial memory, and further to a cellular phone including such a device.

2. Description of the Related Art

In general, a multi-dial memory used in a cellular phone stores therein a plurality of addresses and a plurality of dial numbers associated with each one of the addresses.

FIG. 1 illustrates an example of such a multi-dial memory. The multi-dial memory stores three addresses, "Bill", "Dick" and "John". The first address "Bill" includes three dial numbers, the second address "Dick" includes four dial numbers, and the third address "John" includes two dial numbers.

When such a multi-dial memory is to be retrieved, a user inputs an address. Then, dial numbers associated with the input address are read out of a multi-dial memory, and the thus read-out dial numbers are displayed in a display screen. Since one address is associated with a plurality of dial numbers, a user scrolls a display screen to thereby select a desired dial number.

There is known a device for retrieving a multi-dial memory by analyzing voice or an aural signal. However, this device is accompanied with a problem that it would be impossible to select one of dial numbers stored in a multi-dial memory, and resultingly, two or more dial numbers might be selected. That is, when a dial number stored in a multi-dial memory is to be selected, by analyzing voice or an aural signal, it would be impossible to select a single dial number.

For instance, Japanese Unexamined Patent Publication No. 61-184027 has suggested a telephone including a first memory storing a plurality of aural patterns in association with a plurality of voices, a second memory storing a plurality of telephone numbers each associated with each one of the aural patterns, a third memory storing a plurality of the voices in association with a plurality of the aural patterns, a voice identifier which compares an input aural pattern to the aural patterns stored in the first memory, and stores the input aural pattern when they are coincident with each other, an automatic dialer which reproduces a voice stored in the third memory in association with the aural pattern coincident with the input aural pattern, and automatically dials a telephone number stored in the second memory in association with the aural pattern, means for deleting selected aural pattern, telephone number and voice each stored in the first, second and third memories, and means for displaying residual capacity of the first, second and third memories.

Japanese Unexamined Patent Publication No. 3-88462 has suggested a dialer including a memory storing names in association with telephone numbers, a voice identifier which identifies a voice input by a user, a display device which displays predetermined response data in response to a user, a dial signal transmitter which transmits a dial signal of a target identified by the voice identifier, and a processor which controls the voice identifier, the memory, the display device, and the dial signal transmitter and carries out steps for calling, in accordance with an aural command input by a user. The processor displays in turn a plurality of candidates stored in the memory, in response to a predetermined command.

Japanese Unexamined Patent Publication No. 7-95279 has suggested a memory dial controller including a memory having a memory dial area in which names are stored in association with telephone numbers, a sort table in which names are sorted, a transmission history area which stores telephone numbers of transmitters and receivers, a first table storing a sequence of transmitting and receiving calls through the use of a memory dial, and a second table in which telephone numbers are arranged in accordance with a frequency of transmitting and receiving calls.

Japanese Unexamined Patent Publication No. 8-147248 has suggested an electronic pocket notebook including means for encoding an operator's voice, and storing the encoded voice in a memory in association with retrieval data, means for retrieving retrieval data stored in the memory, in accordance with a voice of an operator, means for displaying the thus retrieved candidates, and means for selecting one of the displayed candidates.

Japanese Unexamined Patent Publication No. 9-233187 has suggested a telephone exchange system including a plurality of terminals and an exchanger connecting the terminals to each other. Each of the terminals is comprised of first means for inputting characters, and second means for, when characters input through first means constitute a name of a user, transmitting an address associated with the name, to the exchanger. The exchanger receives addresses from the terminals, and connects to target terminals indicated by the received addresses.

SUMMARY OF THE INVENTION

It is an object of the present invention to provide a device for retrieving dial data, which device is capable of shortening a period of time required for retrieving a target dial number.

It is also an object of the present invention to provide a cellular phone capable of shortening a period of time required for retrieving a target dial number.

It is further an object of the present invention to provide a method of retrieving dial data, which method is capable of shortening a period of time required for retrieving a target dial number.

In one aspect of the present invention, there is provided a device used in a telephone terminal including a dial memory storing at least one address and a plurality of dial data associated with the address, for retrieving one of the dial data, an identifier being assigned to each one of the dial data, the device, on receipt of both a first signal indicative of the identifier and an aural signal indicative of the address, retrieving the dial data in accordance with the received first and aural signals, reading out dial data identified by the first and aural signals, and displaying the thus read-out dial data in a display screen.

For instance, the identifier may be comprised of a number in accordance with which the dial data is arranged.

It is preferable that the device includes (a) a voice-identifier which identifies the aural signal, and (b) a controller which retrieves the dial memory in accordance with both the result of identification carried out by the voice-identifier and the identifier or the number.

It is preferable that the device includes a plurality of digit keys through which the number is input into the device.

The controller may be comprised of (b1) a detector which detects actuation of any one of the digit keys, and (b2) a retriever which retrieves the dial memory in accordance with both the result of identification and a number indicated by one of the digit keys.

It is preferable that the device further includes a voice-input start key, the aural signal being effective only when the aural signal is input into the device after the voice-input start key has been actuated, in which case, the controller may be comprised of (b1) a detector which detects actuation of any one of the digit keys, and (b2) a retriever which retrieves the dial memory in accordance with both the result of identification and a number indicated by the actuated digit key.

As an alternative, the controller may be comprised of (b1) a detector which detects actuation of any one of the digit keys only when the digit key is kept actuated for a predetermined period of time, and (b2) a retriever which retrieves the dial memory in accordance with both the result of identification and a number indicated by the actuated digit key.

In another aspect of the present invention, there is provided a cellular phone including (a) a display screen, (b) a memory storing at least one address and a plurality of dial data associated with the address, an identifier being assigned to each one of the dial data, (c) a plurality of digit keys through which the identifier is input, (d) a microphone through which an aural signal indicative of an address is input, and (e) a controller which receives both the identifier and the address, retrieves the dial data in accordance with the identifier and the address, reads dial data identified by the identifier and the address, out of the memory, and displays the thus read-out dial data in the display screen.

For instance, the identifier may be comprised of a number in accordance with which the dial data is arranged.

It is preferable that the cellular phone further includes a voice-identifier which analyzes the aural signal and identifies the address indicated by the aural signal.

It is preferable that the cellular phone further includes a detector which detects actuation of any one of the digit keys, and identifies the number associated with the actuated digit key.

It is preferable that the cellular phone further includes a voice-input start key, the aural signal being effective only when the aural signal is input into the device after the voice-input start key has been actuated.

It is preferable that the cellular phone further includes a detector which detects actuation of any one of the digit keys only when the digit key is kept actuated for a predetermined period of time, identifies the number associated with the actuated digit key, and transmits the thus identified number to the controller.

In still another aspect of the present invention, there is provided a method of retrieving dial data, including the steps of (a) inputting an identifier which identifies one dial data, (b) actuating a voice-input start key, (c) inputting an aural signal indicative of an address associated with a plurality of dial data, (d) retrieving a memory to check whether the memory includes a combination of the identifier and the address, and (e) displaying both the address and dial data identified by the identifier.

It is preferable that the identifier is input in the step (a) by actuating one of digit keys.

For instance, the identifier is comprised of a number in accordance with which the dial data is arranged.

There is further provided a method of retrieving dial data, including the steps of (a) inputting an identifier which identifies one dial data, for a predetermined period of time, (b) inputting an aural signal indicative of an address associated with a plurality of dial data, (c) retrieving a memory to check whether the memory includes a combination of the identifier and the address, and (d) displaying both the address and dial data identified by the identifier.

The advantages obtained by the aforementioned present invention will be described hereinbelow.

In accordance with the above-mentioned present invention, one of dial numbers stored in a memory is selected by both the aural signal and the identifier input through a digit key, for instance. Hence, it is possible to select a desired dial number among a plurality of dial numbers without fail. Thus, the present invention makes it possible to retrieve a target dial number more readily and in a shorter period of time than a conventional device.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 1 illustrates an example of addresses and associated telephone number both stored in a multi-dial memory.

DESCRIPTION OF THE PREFERRED EMBODIMENTS

Figure 2:
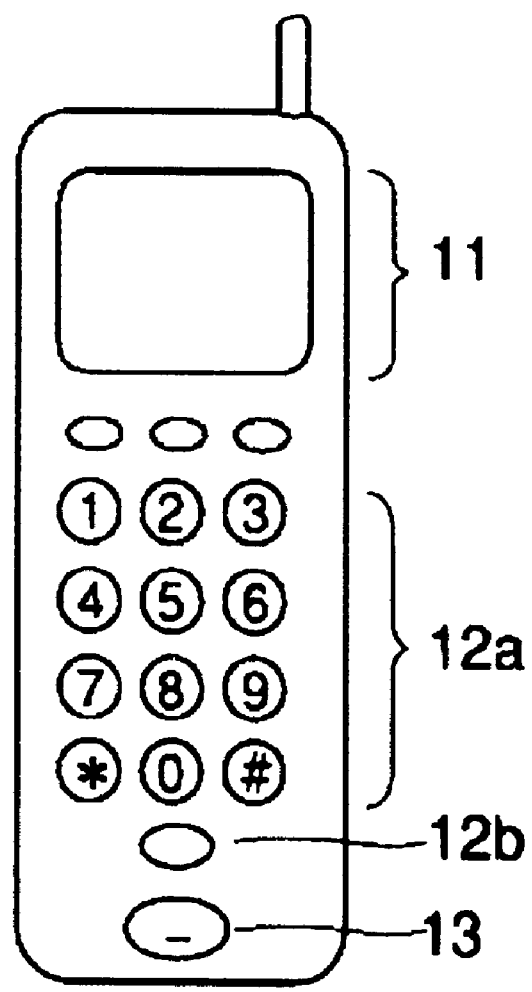
FIG. 2 is a front view of a cellular phone including a dial memory retriever in accordance with the embodiment of the present invention.
Figure 3:
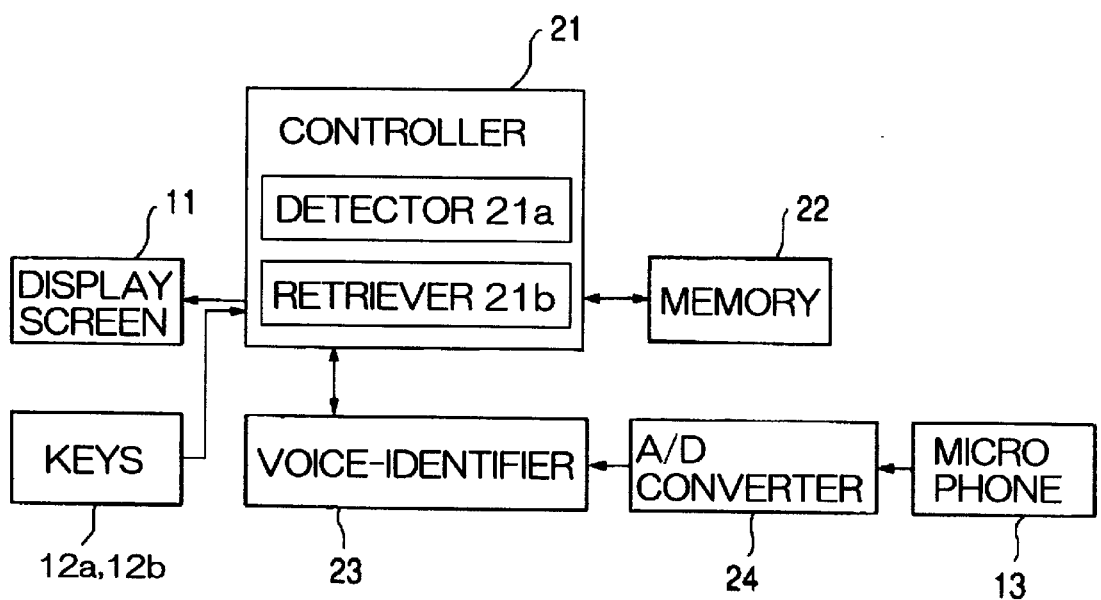
FIG. 3 is a block diagram of the cellular phone illustrated in FIG. 2.

FIG. 2 illustrates a cellular phone 10 to which a device for retrieving dial data in accordance with a preferred embodiment of the present invention is applied. FIG. 3 is a block diagram of the cellular phone 10.

The illustrated cellular phone 10 is comprised of a display screen 11, a memory 22, as a multi-dial memory, storing a plurality of addresses and a plurality of dial data associated with each of the addresses, a plurality of digit keys 12a, a voice-input start key 12b, a microphone 13 through which an operator' voice or an aural signal indicative of an address is input, a controller 21 which retrieves dial data stored in the memory 22 and displays desired dial data in the display screen 11, an analog-to-digital converter 24 which converts an aural signal into a digital signal, and a voice-identifier 23 analyzes an input aural signal and identifies an address indicated by the aural signal.

The addresses stored in the memory 22 include names, initials and other characters for identifying persons. The dial data stored in the memory 22 includes telephone numbers, fax numbers, mail address and other data for communication.

An identifier is assigned to each one of dial data. In the embodiment, an identifier is comprised of a number in accordance with which dial data is arranged. For instance, with reference to FIG. 1, the first listed telephone number "090-123-4567" in Bill has an identifier of one (1), and the second listed telephone number "090-234-5678" in Bill has an identifier of two (2).

The identifier is input through the digit keys 12a. For instance, if an operator pushes the digit key "1", the identifier "1" is input into the cellular phone 10.

The display screen 11, the digit keys 12a, the voice-input start key 12b, the memory 22 and the voice-identifier 23 are all electrically connected to the controller 21. The identifier is input into the controller through the digit keys 12a. The address is input into the controller 21 from the voice-identifier 23. The controller 21 receives both the identifier and the address, retrieves dial data stored in the memory 22 in accordance with the received address and identifier, reads dial data identified by the identifier and the address, out of the memory 22, and displays the thus read-out dial data in the display screen 11.

The controller 21 includes a detector 21a and a retriever 21b.

The detector 21a detects actuation of any one of the digit keys 12a, and identifies a number associated with the actuated digit key 12a. For instance, if the digit key "3" is actuated by an operator, the detector 21a identifies three (3) as an identifier.

The retriever 21b retrieves dial data stored in the memory 22 in accordance with both the address transmitted through the voice-identifier 23 and the identifier which the detector 21 has identified.

An operator's voice or an aural signal is effective only when the aural signal is input into the controller 21 through the microphone 13 after the voice-input start key 12b has been actuated.

Figure 4:
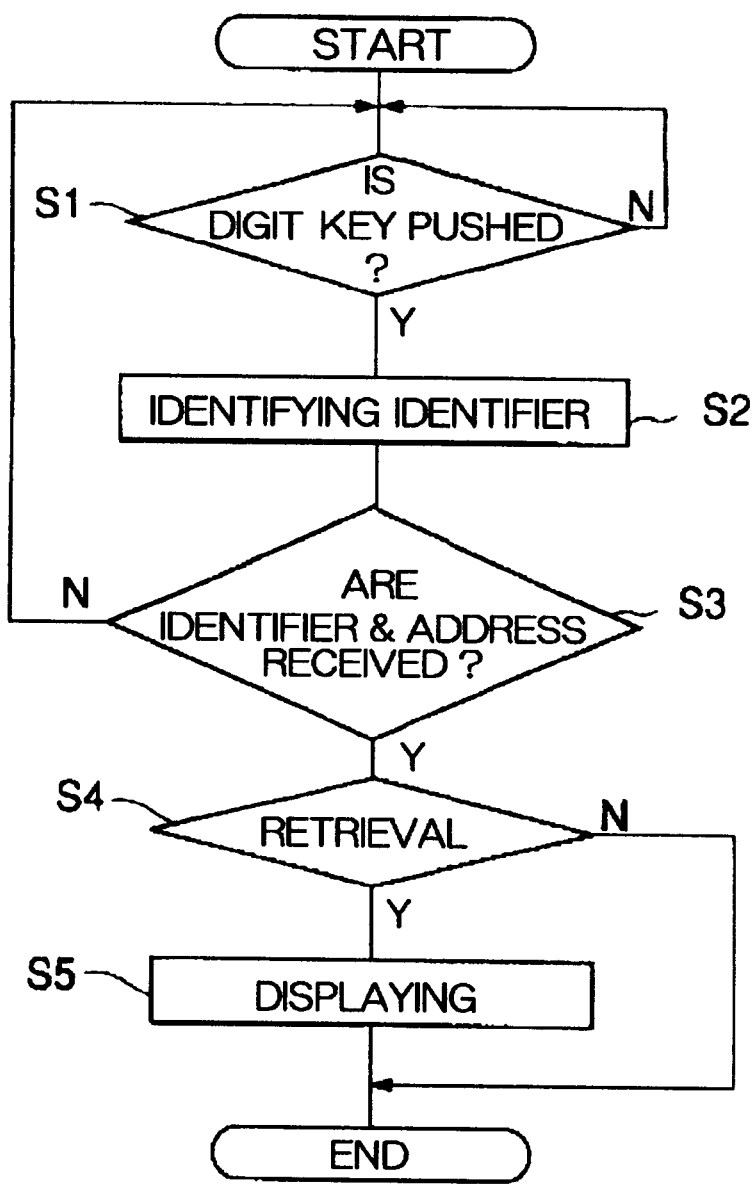
FIG. 4 is a flow chart showing an operation of a dial memory retriever in accordance with the embodiment of the present invention.

Hereinbelow is explained an example of how dial data stored in the memory 22 is retrieved in the cellular phone 10, with reference to FIG. 4.

First, an operator selects and pushes one of the digit keys 12a. For instance, if an operator selects a first listed telephone number in a certain address, he/she pushes the digit key "1".

Then, the detector 21a in the controller 21 detects that the digit key "1" has been pushed (YES in step S1), and identifies "1" as an identifier (step S2).

Then, an operator pushes the voice-input start key 12b, and thereafter, inputs an address in the form of a voice or an aural signal through the microphone 13. The thus input aural signal is converted into a digital signal in the A/D converter 24, and the thus converted digital signal is transmitted into the voice-identifier 23.

The voice-identifier 23 identifies an address indicated by the digital signal, and transmits the thus identified address to the controller 21.

When the controller 21 identifies the identifier and receives the address (YES in step S3), the retriever 21b retrieves dial data stored in the memory 22 to thereby check whether there is a telephone number identified by the address and the identifier (step S4). That is, the retriever 21b compares the address to addresses stored in the memory 22, and further compares the identifier to numbers in the selected address.

If the retriever 21b finds a combination of an address and an identifier which is coincident with the received address and identifier (YES in step S4), the controller 21 displays both a name associated with the address and a telephone number associated with the identifier, in the display screen (step S5).

For instance, if an operator pushes the digit key "2", and inputs "Dick" as an aural signal into the cellular phone 10 through the microphone 13, the retriever 21b retrieves dial data stored in the memory 22 to thereby check whether there is stored a combination of the address "Dick" and the identifier "2".

As illustrated in FIG. 1, there exists a combination of the address "Dick" and the identifier "2" in the memory 22. Accordingly, the controller 21 displays "Dick 090-567-8901" in the display screen 11.

If an operator pushes the digit key "4", and inputs "Bill" as an aural signal into the cellular phone 10 through the microphone 13, the controller 21 displays "Not Found" in the display screen 11, because there does not exist a combination of the address "Bill" and the identifier "4" in the memory 22.

Figure 5:
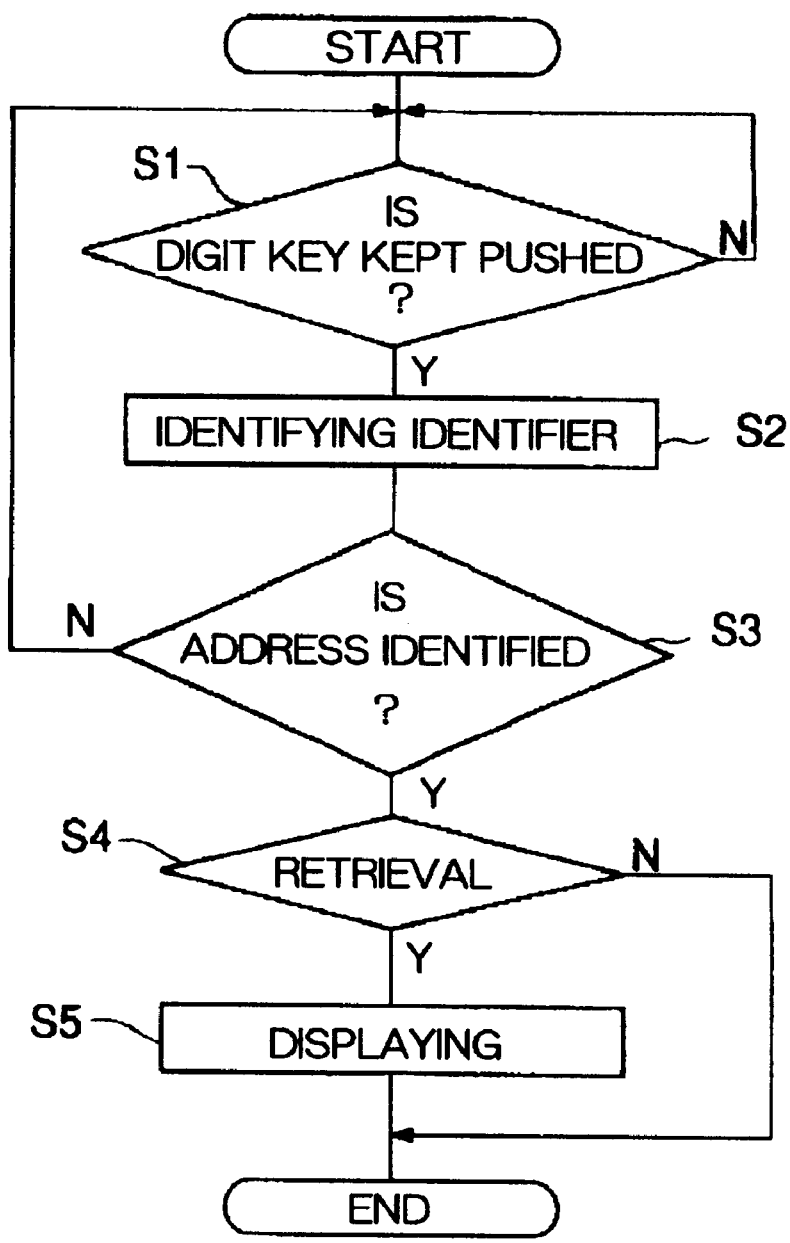
FIG. 5 is a flow chart showing another operation of a dial memory retriever in accordance with the embodiment of the present invention.

Hereinbelow is explained another example of how dial data stored in the memory 22 is retrieved in the cellular phone 10, with reference to FIG. 5.

In this example, an identifier can be input into the cellular phone 10 only when any one of digit keys is kept actuated for a predetermined period of time or longer. In this example, a predetermined period of time is set equal to 3 seconds.

First, an operator selects and pushes one of the digit keys 12a. For instance, if an operator selects a first listed telephone number in a certain address, he/she pushes the digit key "1".

Then, the detector 21a in the controller 21 checks that the digit key "1" was kept actuated for 3 seconds or longer, in step S1.

If the digit key "1" was kept actuated for 3 seconds or longer (YES in step S1), the detector 21a identifies "1" as an identifier (step S2). Then, the controller 21 displays "1" in the display screen 11.

Then, an operator inputs an address in the form of a voice or an aural signal through the microphone 13. The thus input aural signal is converted into a digital signal in the A/D converter 24, and the thus converted digital signal is transmitted into the voice-identifier 23.

Then, the controller 21 checks whether the voice-identifier 23 could identify the thus input aural signal (step S3).

If the voice-identifier 23 successfully identifies the thus input aural signal (YES in step S3), the retriever 21b retrieves dial data stored in the memory 22 to thereby check whether there is a telephone number identified by the address and the identifier (step S4). That is, the retriever 21b compares the address to addresses stored in the memory 22, and further compares the identifier to numbers in the selected address.

If the retriever 21b finds a combination of an address and an identifier which is coincident with the received address and identifier (YES in step S4), the controller 21 displays both a name associated with the address and a telephone number associated with the identifier, in the display screen (step S5).

For instance, if an operator keeps the digit key "2" pushed for 4 seconds, and inputs "Dick" as an aural signal into the cellular phone 10 through the microphone 13, the retriever 21b retrieves dial data stored in the memory 22 to thereby check whether there is stored a combination of the address "Dick" and the identifier "2".

As illustrated in FIG. 1, there exists a combination of the address "Dick" and the identifier "2" in the memory 22. Accordingly, the controller 21 displays "Dick 090-567-8901" in the display screen 11.

In this example, if any one of the digit keys 12a is kept actuated for 3 seconds or longer, the controller 21 regards the actuation in the same light with actuation of the voice-input start key 12b. As a result, the example makes it possible for an operator to input an aural signal without actuating the voice-input start key 12b, ensuring reduction in the number of actuation of digit keys.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 11-64818 filed on Mar. 11, 1999 including specification, claims, drawings and summary is incorporated herein by reference in its entirety.

What is claimed is:

1. A device used in a telephone terminal including a dial memory storing at least one address and a plurality of dial data associated with said address, for retrieving one of said dial data, an identifier being assigned to each one of said dial data, said device, on receipt of both a first signal indicative of said identifier and an aural signal indicative of said address, retrieving said dial data in accordance with the received first and aural signals, reading out dial data identified by said first and aural signals, and displaying the thus read-out dial data in a display screen.

2. The device as set forth in claim 1, wherein said identifier is comprised of a number in accordance with which said dial data is arranged.

3. The device as set forth in claim 1, wherein said device includes:

(a) a voice-identifier which identifies said aural signal; and (b) a controller which retrieves said dial memory in accordance with both the result of identification carried out by said voice-identifier and said identifier.

4. The device as set forth in claim 2, wherein said device includes:

(a) a voice-identifier which identifies said aural signal; and (b) a controller which retrieves said dial memory in accordance with both the result of identification carried out by said voice-identifier and said number.

5. The device as set forth in claim 4, wherein said device includes a plurality of digit keys through which said number is input into said device.

6. The device as set forth in claim 5, wherein said controller is comprised of:

(b1) a detector which detects actuation of any one of said digit keys; and (b2) a retriever which retrieves said dial memory in accordance with both said result of identification and a number indicated by one of said digit keys.

7. The device as set forth in claim 5, wherein said device further includes a voice-input start key, said aural signal being effective only when said aural signal is input into said device after said voice-input start key has been actuated, and wherein said controller is comprised of:

(b1) a detector which detects actuation of any one of said digit keys; and (b2) a retriever which retrieves said dial memory in accordance with both said result of identification and a number indicated by the actuated digit key.

8. The device as set forth in claim 5, wherein said controller is comprised of:

(b1) a detector which detects actuation of any one of said digit keys only when the digit key is kept actuated for a predetermined period of time; and (b2) a retriever which retrieves said dial memory in accordance with both said result of identification and a number indicated by the actuated digit key.

9. A cellular phone comprising:

(a) a display screen;

(b) a memory storing at least one address and a plurality of dial data associated with said address, an identifier being assigned to each one of said dial data;

(c) a plurality of digit keys through which said identifier is input;

(d) a microphone through which an aural signal indicative of an address is input; and (e) a controller which receives both said identifier and said address, retrieves said dial data in accordance with said identifier and said address, reads dial data identified by said identifier and said address, out of said memory, and displays the thus read-out dial data in said display screen.

10. The cellular phone as set forth in claim 9, wherein said identifier is comprised of a number in accordance with which said dial data is arranged.

11. The cellular phone as set forth in claim 9, further comprising a voice-identifier which analyzes said aural signal and identifies said address indicated by said aural signal.

12. The cellular phone as set forth in claim 10, further comprising a detector which detects actuation of any one of said digit keys, and identifies said number associated with the actuated digit key.

13. The cellular phone as set forth in claim 9, further comprising a voice-input start key, said aural signal being effective only when said aural signal is input into said device after said voice-input start key has been actuated.

14. The cellular phone as set forth in claim 10, further comprising a detector which detects actuation of any one of said digit keys only when the digit key is kept actuated for a predetermined period of time, and identifies said number associated with the actuated digit key.

15. A method of retrieving dial data, comprising the steps of:

(a) inputting an identifier which identifies one dial data;

(b) actuating a voice-input start key;

(c) inputting an aural signal indicative of an address associated with a plurality of dial data;

(d) retrieving a memory to check whether said memory includes a combination of said identifier and said address; and (e) displaying both said address and dial data identified by said identifier.

16. The method as set forth in claim 15, wherein said identifier is input in said step (a) by actuating one of digit keys.

17. The method as set forth in claim 15, wherein said identifier is comprised of a number in accordance with which said dial data is arranged.

18. A method of retrieving dial data, comprising the steps of:

(a) inputting an identifier which identifies one dial data, for a predetermined period of time;

(b) inputting an aural signal indicative of an address associated with a plurality of dial data;

(c) retrieving a memory to check whether said memory includes a combination of said identifier and said address; and (d) displaying both said address and dial data identified by said identifier.

19. The method as set forth in claim 18, wherein said identifier is input in said step (a) by keeping one of digit keys actuated for a predetermined period of time.

20. The method as set forth in claim 18, wherein said identifier is comprised of a number in accordance with which said dial data is arranged.

* * * * *